United States Patent [19]

Hagenbach

[11] Patent Number: 4,894,305

[45] Date of Patent: Jan. 16, 1990

[54] CARRIER AND DEVELOPER COMPOSITIONS GENERATED FROM FLY ASH PARTICLES

[75] Inventor: Robert J. Hagenbach, Rochester, N.Y.

[73] Assignee: Xerox Corporation, Stamford, Conn.

[21] Appl. No.: 850,650

[22] Filed: Apr. 11, 1986

Related U.S. Application Data

[63] Continuation-in-part of Ser. No. 611,294, May 17, 1984, abandoned.

[51] Int. Cl.[4] .......................... G03G 9/10; G03G 9/14; C03G 49/08

[52] U.S. Cl. .................................. 430/106.6; 430/108; 252/62.56; 252/62.58; 252/62.59; 252/62.60; 252/62.62; 252/62.63; 252/62.64; 106/DIG. 1

[58] Field of Search ...................... 430/106.6, 108, 126

[56] References Cited

U.S. PATENT DOCUMENTS

| | | | |
|---|---|---|---|
| Re. 31,540 | 3/1984 | Aldrich | 209/172.5 |
| 2,856,365 | 10/1955 | Heck et al. | 252/62.5 |
| 2,886,529 | 7/1953 | Guillaud | 252/62.5 |
| 2,927,896 | 12/1955 | Bergmann | 252/62.5 |
| 3,526,533 | 8/1966 | Tacknow et al. | 430/108 |
| 3,565,805 | 8/1963 | Jones et al. | 430/108 |
| 3,767,477 | 10/1973 | McCabe et al. | 148/6.35 |
| 3,795,618 | 3/1972 | Kasper | 430/108 |
| 3,939,086 | 2/1976 | Hagenbach | 427/216 |
| 4,076,640 | 2/1978 | Forgensi et al. | 427/127 |
| 4,172,722 | 10/1979 | Hirakura et al. | 430/126 |
| 4,267,247 | 5/1981 | Ziolo et al. | 430/120 |
| 4,268,320 | 5/1981 | Klingaman et al. | 106/288 B |
| 4,319,988 | 3/1982 | Aldrich | 209/172.5 |
| 4,386,057 | 5/1983 | Dobbins et al. | 423/138 |
| 4,425,383 | 1/1984 | Creatura | 427/216 |
| 4,485,162 | 11/1984 | Imamura et al. | 430/106.6 |
| 4,592,988 | 6/1986 | Aldrich et al. | 430/108 X |

FOREIGN PATENT DOCUMENTS

| | | |
|---|---|---|
| 0013009 | 7/1980 | European Pat. Off. . |
| 0088835 | 9/1983 | European Pat. Off. . |
| 2103816 | 2/1983 | United Kingdom . |

OTHER PUBLICATIONS

"The Encyclopedia of Chemistry", Second Edition; Van Nostrand Reinhold Co., pp. 407–408.

"Magnetic Components and Particle Size Distribution of Coal Fly Ash," Chadda & Sechra, DOE Report No. DOE/MC/14718-1213 (DE83000576), pp. 16–18.

"Chemical Species in Fly Ash from Coal-Burning Power Plants", Science 210, (1980) pp. 1356–1357, Hulett et al.

Report RP1061 (Electric Power Research Institute, Palo Alto, CA, Jul. 1979), pp. 45–53, Hulett et al.

"Specification in Size and Density Fractionated Fly Ash", Materials, Research Society 1985 Fall Meeting, Sym. T., Boston, MA, 12/2 to 7, 1985, pp. 3–5, Hemmings et al.

"Characteristics of PFA", Technical Bulletin No. 8, received in 1983.

"Advanced Inorganic Chemistry", (New York: Interscience), Cotton et al., pp. 806–808.

*Primary Examiner*—Roland E. Martin
*Attorney, Agent, or Firm*—E. O. Palazzo

[57] ABSTRACT

Carrier particles with an average diameter of greater than 44 microns are generated from fly ash, and subsequently admixed with toner compositions enabling developer compositions useful for incorporation into xerographic imaging apparatuses. The aforementioned carrier particles have an apparent density of from about 2.4 to 2.6 grams/cm$^3$ and a magnetic moment of from about 60 to about 70 electromagnetic units. Images with substantially no background deposits, that is, no dark bands appearing thereon, and substantially no white spots resulted with the aforementioned developer compositions.

71 Claims, No Drawings

CARRIER AND DEVELOPER COMPOSITIONS GENERATED FROM FLY ASH PARTICLES

The present application is a continuation-in-part of U.S. Ser. No. 611,294, now abandoned, entitled Process for Magnetic Carrier Particles. The subject matter of the aforementioned copending application is totally incorporated herein by reference.

BACKGROUND OF THE INVENTION

This invention is generally directed to carrier and developer compositions, and more specifically the present invention relates to specific carrier compositions formulated from fly ash; and wherein the carrier particles have an average diameter of greater than 44 microns. In one embodiment of the present invention, therefore, carrier and developer compositions are obtained from fly ash, which compositions when incorporated into xerographic imaging and/or printing apparatuses enable images of excellent resolution; that is, with substantially no background, an absence of dark, undesirable bands appearing thereon, and substantially no adverse bead carryout.

Additionally, in another specific embodiment of the present invention, undesirable fly ash generated by the burning coal is subjected to classification, and dry magnetic separation wherein there results specific spherical carrier particles useful in electrostatographic imaging systems. The aforementioned developer compositions, and particularly the spherical carrier components thereof are obtained in a simple and economical manner thereby enabling in most instances low cost developer compositions in comparison to those compositions obtained in many of the prior art processes.

The formation and development of xerographic latent images generated on photoconductive devices by electrostatic means is well known, one such method involving the formation of an electrostatic latent image on the surface of a photoreceptor. This photoreceptor is generally comprised of a conductive substrate containing on its surface a layer of photoconductive insulating material; and in many instances a thin barrier is situated between the substrate and photoconductive layer for the purpose of preventing undesirable charge injection. The latent image generated on the photoconductive member can be developed by a composition comprised of toner particles and carrier particles. The carrier particles generally consist of various materials, inclusive of those which may contain a coating thereon. Thus, there can be selected as carriers those described in U.S. Pat. No. 3,767,578, which illustrates developer mixtures containing nodular carrier beads having a number size average distribution in the range of 50 to 1,000 microns. Examples of carrier beads disclosed in this patent include metals such as steel, copper, nickel, ceramics, or glasses. According to the disclosure of the '578 patent, ceramic or brass carrier particles can be prepared from a wide variety of magnetic or nonmagnetic refractory oxides including silicon, aluminum, iron oxide, nickel oxide, and the like. In one embodiment the carrier substances of this patent are prepared by agglomerating small particles with known granulating or pelletizing procedures, preferably in the presence of a resinous binder. The agglomerates are heated for the purpose of providing hardness and strength to the carrier particles. Specifically, it is indicated in U.S. Pat. No. 3,767,578 that one useful method for preparing carrier particles involves mixing a particulate carrier material with a binder, and charging the mixture to an inclined rotary mixing plate over which is sprayed a liquid to affect the wetting of the particles. As the mixing plate rotates the agglomerates continue to grow. The largest agglomerates are directed to the surface and roll off at the ascending side of the lower edge of the mixing plate. The smaller agglomerates remain on the rotary plate until they become larger. By variation of the angel of inclination of the rotary plate, the periphery velocity, the location of the charging area within which the material is introduced into the rotary plate, and the height of the peripheral edge of the rotary plate, the size range of the resulting agglomerates can be adjusted to within close tolerances.

Also, there is illustrated in U.S. Pat. No. 4,125,667 a process for preparing high surface area ferromagnetic carrier materials wherein the materials have been classified enabling a specific surface area of at least about 150 $cm^2$ per gram, a particle size volume distribution wherein the geometric standard deviation is less than about 1.3, and a particle size distribution with an average particle diameter of less than about 100 microns. Suitable classification methods disclosed in this patent include air classification, screening, cyclone separation, centrifugation, and combinations thereof.

Additionally, in U.S. Pat. No. 3,939,086, there is described a method for obtaining highly classified steel carrier cores by mechanically separating round particles from irregularly shaped beads through controlled vibration, such as a vibrating table set at a predetermined slope. It is indicated in this patent that raw low carbon hypereutectoid steel beads when received from the manufacturer are generally not satisfactory as electrostatographic carrier cores since they usually contain at least about 30 percent by weight of nonround materials. Apparently, the raw steel beads are manufactured by a rotating electrode process, or atomized from an electric arc furnace melt; and although spherical particles are produced, mixtures of round and irregular shaped particles generally result from these processes. It is known that nonround particles are generally undesirable since they contain slag, hollow particles, chipped particles, and flat particles, which cause variations in electrostatic carrier density resulting in carrier beads sticking to electrostatic drum surfaces thereby causing print deletions, scratches on the photoreceptor surface, and nonuniformity of triboelectric properties in the developer mixture. A similar disclosure is contained in U.S. Pat. No. 3,849,182.

Moreover, there is disclosed in U.S. Pat. No. 3,769,053 processes for the treatment of fly ash enabling iron concentrate products with from about 45 to about 65 percent by weight of iron, reference column 3, beginning at line 35. The specific steps for obtaining the products of the '053 patent are outlined in column 2, beginning at line 5. However, the specific particles obtained in accordance with the teachings of the '053 patent have several disadvantages associated therewith including that most of the particles have an average diameter of less than 44 microns, and therefore are not very useful as carrier particles in xerographic imaging systems. Specifically, thus the particles prepared in accordance with the '053 patent when incorporated, for example, into xerographic imaging systems as part of a xerographic developer composition permitted in images with undesirable bands thereon; and further, with the aforementioned compositions, bead carrout occurs.

Moreover, the magnetic particles formulated in accordance with the teachings of the '053 patent, and in particular particles obtained by the process of working Example I, possess characteristics that prevent in most instances their utilization in electrostatographic imaging systems in that, for example, images of low resolution, including those with undesirable bands thereon, are obtained. Specifically, thus the particles obtained in accordance with the process of Example I of the '053 patent contain 56.5 percent by weight of iron, have a saturation magnetization of 53 electromagnetic units per gram (emu/gram), and an apparent density of 2.2 grams/cm$^3$. Furthermore, magnetic particles obtained in accordance with the process of Example III contained 57.2 percent by weight of iron, have a saturation magnetization of 51 emu/gram, and an apparent density of 2.2 grams/cm$^3$.

Moreover, there is disclosed in U.S. Pat. No. 4,319,988 a specific process for the separation of high grade magnetite from fly ash by adhering to specific process steps, reference column 7, beginning at around line 19. Specifically, thus there are obtained in accordance with the teachings of the '988 patent magnetites from fly ash which are useful, for example, in the cleaning of coals. However, there is no teaching in this patent with respect to obtaining carrier particles, particularly those that have an average diameter of greater than 44 microns.

Although magnetic particles produced by some of the processes described are generally suitable for their intended purposes, there continues to be a need for improved processes for preparing and obtaining carrier particles. Additionally, there continues to be a need for a simple, economically attractive process for obtaining carrier particles suitable for use in developer compositions. Additionally, there continues to be a need for specific spherical carrier particles, particularly those resulting from fly ash; and wherein the particles obtained can, subsequent to coating, be incorporated into developer mixtures useful for permitting the development of latent electrostatic images. Moreover, there continues to be a need for the formulation of spherical carrier particles from waste fly ash. Also, there continues to be a need for iron oxide carrier particles which have an apparent density of at least 2.2 or equal to or greater than 2.4 grams/cm$^3$, thus resulting in particles of high purity enabling their use for incorporation into xerographic developer mixtures. There also is a need for carrier particles that are of low density and low magnetic moment enabling the use of a softer and less abrasive brush system in electrostatographic imaging processes.

There is also a need for spherical magnetic carrier particles useful in xerographic imaging apparatuses, which particles have an average particle diameter of greater than 44 microns, a magnetic moment of from about 60 to about 70 electromagnetic units per gram, and an apparent density greater than 2.4 grams/cm$^3$; or which carrier particles have a magnetic moment of from about 50 to about 70 electromagnetic units per gram and a density of from about 2.2 to about 2.5 grams/cm$^3$.

OBJECTS OF THE INVENTION

It is an object of the present invention to provide carrier particles which overcome many of the above noted disadvantages.

In a further object of the present invention there are provided carrier particles obtained from fly ash.

Also, in another object of the present invention there are provided specific carrier particles spherical in shape and formulated from fly ash.

In another object of the present invention there are provided carrier particles obtained from fly ash, which particles can be incorporated into a xerographic developer mixture.

Additionally, in a further object of the present invention there are provided carrier particles with an average diameter of greater than about 44 microns, and wherein these particles are obtained from fly ash.

Also, in yet another object of the present invention there are provided developer compositions comprised of spherically shaped carrier particles with an average particle diameter of greater than 44 microns, and toner particles.

Further, in another object of the present invention there are provided spherical carrier particles obtained from fly ash, which particles have an apparent density of from about 2.4 to about 2.6 grams/cm$^3$; an average particle diameter of greater than 44 microns; and a saturation magnetization from between about 60 and 70 emu/grams.

In yet another object of the present invention a process is provided wherein useful carrier particles are obtained by subjecting fly ash to a specific classification process, followed by dry magnetic separation.

Another object of the present invention resides in the provision of a process for obtaining carrier particles from fly ash, wherein the carrier particles, subsequent to coating, can be incorporated into a xerographic developer mixture.

Also, in still another object of the present invention there are provided processes for obtaining from fly ash carrier particles of lower density and lower magnetic moments than steel carrier cores.

Further, in another object of the present invention there are provided developer compositions comprised of toner resin particles, pigment particles, and specific spherical carrier particles obtained from fly ash in accordance with the process illustrated herein.

These and other objects of the present invention are accomplished by providing carrier particles with an average particle diameter of greater than about 44 microns, and the other desirable characteristics illustrated herein. Specifically, in one embodiment of the present invention there are provided spherical carrier particles with an average particle diameter of greater than 44 microns; an apparent density equal to or greater than 2.4 grams/cm$^3$; and a magnetic moment of from about 60 to about 70 electromagnetic units by a process which comprises (1) providing residual fly ash particles containing a magnetic component; (2) subjecting the particles to classification, especially an air jet sieve classification for the purpose of removing particles of a diameter of less than about 44 microns; (3) introducing the resulting particles into a magnetic separator, wherein the magnetic components thereof are separated from the nonmagnetic particles; (4) removing the deposited magnetic particles; and (5) subjecting the deposited particles to further separation.

In another embodiment of the present invention, there are provided developer compositions comprised of toner resin particles, pigment particles, and as carrier particles those obtained by a process which encompasses (1) providing residual fly ash particles containing a magnetic component; (2) subjecting the particles to classification for the purpose of removing particles of a diameter of less than 44 microns; (3) introducing the resulting particles into a magnetic separator, wherein the magnetic components thereof are separated from the nonmagnetic fly ash particles; (4) removing the deposited magnetic particles; and (5) subjecting the deposited particles to further separation, wherein there result magnetic carrier particles with an average diameter of greater than 44 microns; an apparent density greater than 2.4 grams/cm$^3$, and the other characteristics illustrated herein. The density parameter can be determined by various methods including the procedure outlined in ASTBM 212-48 with a Hall Flow Meter.

In a further embodiment of the present invention there is provided a process for developing electrostatic images which comprises (1) providing an electrostatic latent image on an imaging member; (2) contacting the image with a developer composition comprised of toner particles and carrier particles; (3) transferring the image to a suitable substrate; and (4) optionally permanently affixing the image to the substrate by heat or other suitable means, wherein the carrier particles incorporated into the developer mixture are obtained by providing residual fly ash particles containing a magnetic component; subjecting the particles to classification for the purpose of removing particles of a diameter of less than about 44 microns; introducing the resulting particles into a magnetic separator, wherein the magnetic components thereof are separated from the nonmagnetic fly ash particles; removing the deposited magnetic particles; and subjecting the deposited particles to further separation, wherein there result magnetic carrier particles of a density greater than 2.4 grams/cm$^3$, a magnetic moment of from between 60 and 70 emu/-gram, and the other characteristics illustrated herein.

DESCRIPTION OF THE PREFERRED EMBODIMENTS

The carrier and developer composition of the present invention will be described with reference to preferred embodiments, however, it is not intended to be limited to the parameters disclosed; rather for example other equivalent compositions and reaction conditions may be suitable, providing the objectives of the present invention are achieved.

The residual fly ash selected for use in the present invention is generally available from electric utility companies such as Rochester Gas and Electric Company. Fly ash results from the burning of coal products, and recently about 70 million tons of fly ash have been produced by U.S. electric utility companies. Therefore, fly ash which is primarily an undesirable waste product is readily available. Many processes have been described for treating fly ash for the purposes of rendering this material more suitable for use as a component in concrete blocks, or as a component in cement substances, as indicated herein. There has been an absence of disclosure, however, with regard to processes for treating fly ash for the purpose of obtaining therefrom magnetic spherical carrier particles which are suitable for use in electrostatic developer mixtures, the main and primary objects of the present invention.

Analysis of fly ash indicates that it is mainly comprised of compounds of iron, silicon, aluminum, calcium, and oxygen. High temperature processing conditions generate fly ash containing a quantity of spherical magnetic particles principally in the form of aluminum, iron and spinel; and it is these particles which, if properly separated from the fly ash, are useful as xerographic carrier particles. Normal separation techniques, including wet separation as disclosed in U.S. Pat. No. 4,319,988, fail to generate magnetic particles which can be useful as carrier substances in xerographic developer mixtures. In contrast with the process of the present invention there is separated from the fly ash all fine particles less than 44 microns in diameter by size classification, and wherein coarse magnetic components are desirably obtained. These coarse magnetic components are of a relatively high purity, that is they have an apparent density greater than 2.4 grams/cm$^3$, a magnetic moment of from about 60 to about 70 electromagnetic units per grain (emu/gram), and further are spherical in shape. For removal of the aforementioned fine particle, the fly ash in one embodiment is subjected to an Alpine air jet sieve classifier equipped with a 325 mesh nylon screen for the purpose of removing particles less than about 44 microns.

More specifically, particularly with respect to the processes referred to in the working Examples encompassed by the present invention, in one specific embodiment of the present invention about 747 pounds of fly ash obtained from a pulverized coal burning power utility source were passed through a Model 100 Alpine Air Jet Sieve Classifier fitted with a 325 mesh nylon screen at a feed rate of 89 pounds per hour enabling the removal of particles with an average diameter of less than 44 microns. As the fly ash particles are transported along the inside of the rotating cylindrical nylon screen, an air jet knife continuously directs air against the outside portion of the screen for the primary purpose of preventing the binding of the screen and enabling the fluidizing of the particles thereby permitting the fine fraction to be sucked through the screen with the desired coarser particles tumbling to the discharge end of the screen where they are collected. About 179 pounds of the coarse particles are collected. With further regard to the aforementioned process steps, the fly ash feed material had an apparent density of 0.87 grams/cm$^3$, and a sieve analysis indicated that the average diameter of the particles was less than 44 microns. Additionally, the desired coarse fraction obtained had a magnetic moment of 14.0 emu/gram, an apparent density of 1.0 grams/cm$^3$, and an average diameter of 63.9 microns as determined by a sieve analysis.

Subsequently, the resulting coarse particles were then introduced into an Eriez Model 10 MM low intensity magnetic belt system to permit the removal of the magnetic particles from the nonmagnetic fly ash particles. The magnetic particles recovered had a magnetic moment of 56.0 emu/grams, an apparent density of 2.16 grams/cm$^3$, and an average diameter of 55 microns as determined by a sieve analysis subsequent to a first pass thereof. Thereafter, the magnetic particles were passed an additional four times through the Eriez magnetic separator; and subsequent to a fifth pass, the magnetic particles had a magnetic moment of 61.4 emu/gram, an apparent density of 2.36 grams/cm$^3$, and an average particle diameter of 55 microns as determined by a sieve analysis.

For the removal of particles with an average diameter of greater than 120 microns and less than 44 microns, the above-prepared particles were screened in a Tyler RO-TAP screening device utilizing a #120 and a #325 U.S. standard 8 inch screen. The resulting magnetic particles had a magnetic moment of 59.6 emu/gram, an apparent density of 2.4 grams/cm$^3$, and were of an average particle diameter of 62.4 microns as determined by a sieve analysis. Prior to coating, the resulting magnetic carrier particles were identified by chemical analysis from which it was determined that the carrier core consisted primarily of iron. One analysis indicated that the core contained 66 percent by weight of iron, about 6 percent by weight of silicon materials, about 3 percent by weight aluminum, about 1 percent calcium, about 23 percent oxygen; and about 1 percent sodium, potassium, magnesium, and the like. The resulting particles are comprised mainly of iron oxide in the form of aluminum ferrite. Another analysis indicated that the core contained an excess of 98 percent by weight of iron, about 1.4 percent by weight of silicon materials, and less than 0.05 percent by weight of chromium, copper, sodium, manganese, lead, tin, zinc, and the like.

These spherical carrier particles, with a diameter of greater than 44 microns and less than 180 microns, or less than 125 microns can then be suitably coated with various resinous material including fluorocarbon polymers, polyester compositions, polyurethanes, phenol formaldehyde resins, various copolymeric materials including copolymers of vinyl acetate and vinyl chloride, terpolymers of styrene, methacrylate, and a siloxane; and other similar materials, reference for example U.S. Pat. Nos. 3,467,634; 3,526,533; and 3,849,182, the disclosures of each of these patents being totally incorporated herein by reference. Examples of other carrier coating materials include thermoplastic resins such as polyolefins, including polyethylene, polypropylene, chlorinated polyethylenes, and chlorosulfonated polyethylenes; polyvinyls, and polyvinylidenes such as polystyrene, polymethylstyrene, polymethacrylate, polyvinylchloride, polyvinylbutyral, polyvinylketones; polytetrafluoroethylenes, polyvinylfluoride, polychlorotrifluoroethylene; polyamides such as polycaprolactone, and the like. Preferred carrier coatings include polyvinylidene fluoride, and terpolymers of styrene, methacrylate, and triethoxysilane. The coating can be contained on the carrier particles over the entire surface thereof, or may be present in a semicontinuous manner.

Subsequent to blending the carrier particles, the resulting composition is screened to remove any agglomerates formed during the coating process, the screen mesh selected depending on the size of the particles desired. The thus obtained carrier particles can then be mixed in suitable proportions with appropriate toner compositions to provide a developer mixture.

Illustrative examples of toner resins that may be selected as a component for the developer composition of the present invention include typical known resins such as polyamides, epoxies, polyurethanes, vinyl resins, polycarbonates, polyesters, diolefins and the like. Any suitable vinyl resin may be selected for the toners of the present system, including homopolymers or copolymers of two or more vinyl monomers. Typical vinyl monomeric units are styrene, vinyl naphthalene, ethylenically unsaturated mono-olefins such as vinyl acetate, vinyl propionate, vinyl benzoate, and vinyl butyrate; ethylenically unsaturated diolefins, such as butadiene; isoprene and the like; esters of aliphatic monocarboxylic acids inclusive of methyl acrylate, ethyl acrylate, n-butylacrylate, isobutyl acrylate, dodecyl acrylate, n-octyl acrylate, phenyl acrylate, methyl methacrylate, ethyl methacrylate, butyl methacrylate and the like; acrylonitrile, methacrylonitrile, vinyl ethers such a vinyl methyl ether, vinyl isobutyl ether, and vinyl ethyl ether; vinyl ketones like vinyl methyl ketone, vinyl hexyl ketone, and methyl isopropenyl ketone; and mixtures thereof. Also, there may be selected as toner components various vinyl resins blended with one or more other resins, preferably other vinyl resins, which insure good triboelectric properties and uniform resistance against physical degradation. However, nonvinyl type thermoplastic resins may also be employed including resin modified phenolformaldehyde resins, oil modified epoxy resins, polyurethane resins, cellulosic resins, polyether resins, linear and branched, polyester resins, and mixtures thereof.

Generally, toner resins containing a relatively high percentage of styrene are preferred. The styrene resin may be a homopolymer of styrene or copolymers of styrene with other monomeric groups. Any of the above suitable typical monomeric units may be copolymerized with styrene by addition polymerization. Styrene resins may also be formed by the polymerization of mixtures of two or more unsaturated monomeric materials with styrene monomer. This additional polymerization technique embraces known polymerization techniques such as free radical, anionic, and cationic polymerization processes.

Additionally, esterification products of a dicarboxylic acid, and a diol comprising a diphenol may be selected as a preferred resin material for the toner compositions of the present invention. These materials are illustrated in U.S. Pat. No. 3,655,374, the disclosure of which is totally incorporated herein by reference, the diphenol reactant being of the formula as shown in column 4, beginning at line 5 of this patent; and the dicarboxylic acid being of the formula as recited in column 6. Other preferred polyester materials selected for the toner resin of the present invention include those described in U.S. Pat. No. 4,049,447, and Canadian Pat. No. 1,032,804, the disclosure of each of these patents being totally incorporated herein by reference.

The resin is present in the toner composition in an amount that permits a total sum of all toner ingredients equal to about 100 percent. Thus, when 10 percent by weight of colorant or pigment is present, such as carbon black, about 90 percent by weight of the resin particles are included in the toner composition.

Any suitable pigment or dye may be selected as the colorant for the toner particles, such materials being well known and including, for example, carbon black, magnetites including Mapico black, a mixture of iron oxides, nigrosine dye, iron oxides, chrome yellow, ultramarine blue, duPont oil red, methylene blue chloride, phthalocyanine blue and mixtures thereof. The pigment or dye should be present in the toner in a sufficient quantity to render it highly colored. For example, where conventional xerographic copies of documents are desired, the toner may comprise a black pigment, such as carbon black, or a black dye such as Amaplast black dye available from the National Aniline Products, Inc. Preferably, the pigment is present in amounts of from about 3 percent to about 50 percent by weight based on the total weight of toner; however, if the pigment employed is a dye, substantially smaller quantities, for example less than 10 percent by weight, may be used.

The spherical carrier particles formulated in accordance with the process of the present invention may then be mixed with the toner composition comprised of the above illustrated toner resin particles, and a colorant such as carbon black, in any suitable effective combinations. However, desirable results are obtained when from about 1 to about 3 parts of toner component are selected, to about 100 parts by weight of carrier material.

Also, the developer composition of the present invention can be selected for the development of electrostatic latent images formed on various photoresponsive devices. Thus, for example, the developer composition of the present invention is useful in xerographic imaging systems which contain as the photoconductive member amorphous selenium; amorphous selenium alloys, including selenium tellurium, selenium arsenic, selenium arsenic tellurium, halogen doped amorphous selenium substances, halogen doped amorphous selenium alloys, wherein the halogen can be a substance such as chlorine present in an amount of from about 200 to about 500 parts per million; and layered photoresponsive devices with a photogenerating layer; and a charge transport layer as described in U.S. Pat. No. 4,265,990, the disclosure of which is totally incorporated herein by reference. Examples of photogenerating layers that may be utilized include trigonal selenium, metal phthalocyanines, metal free phthalocyanines, vanadyl phthalocyanines, and the like, while examples of transport layers include various diamines dispersed in resinous binders. Furthermore, the developer compositions of the present invention may be selected for ionographic imaging processes and may be incorporated in xerographic printing systems.

With further respect to the developer compositions of the present invention, they may contain therein additive particles including colloidal silicas, metal salts, metal salts of fatty acids, and low molecular weight waxy substances. The additive particles, with the exception of the waxy component, are present in an amount of from about 0.1 to about 1 percent by weight, and include zinc stearate and Aerosil, reference U.S. Pat. Nos. 3,983,045 and 3,590,000, the disclosures of which are totally incorporated herein by reference. The waxes which are of a molecular weight of from about 1,000 to about 20,000, and preferably from about 1,000 to about 6,000, include polyethylenes, polypropylenes, and similar equivalent components, reference British Pat. No. 1,442,835, the disclosure of which is totally incorporated herein by reference. Moreover, there can be included in the toner terpolymer resins, particularly crosslinked terpolymers in amounts of from about 15 percent by weight to about 25 percent by weight.

The following examples are being submitted to further define the present invention. These examples are intended to illustrate and not limit the scope of the present invention. Parts and percentages are by weight unless otherwise indicated.

EXAMPLE I

Spherical magnetic carrier particles extracted from utility fly ash compositions, as described herein, with an average particle size of 74 microns, an apparent density of 2.4 grams/cm$^3$, and a magnetic moment of 63 emu/gram, were coated with 0.8 percent by weight of a terpolymer of styrene, methacrylate and vinyl triethoxysilane, reference U.S. Pat. No. 3,467,634, the disclosure of which is totally incorporated herein by reference.

Subsequently, 2.2 pounds of the above prepared carrier particles were blended with 37.9 grams of a toner composition containing a resin mixture of 67.5 percent by weight of a styrene butylmethacrylate copolymer resin, containing 58 percent by weight of styrene, and 42 percent by weight of n-butylmethacrylate, which resin contains therein about 7 percent by weight of polypropylene wax, and a divinyl benzene crosslinked styrene, butylacrylate, acrylonitrile terpolymer, 22.5 percent by weight, 10 percent by weight of carbon black particles, and as additives 0.15 percent by weight of zinc stearate, and 0.4 percent by weight of colloidal silica. The resulting developer mixture was roll milled for 30 minutes.

Thereafter, the above prepared developer mixture was placed in a Xerox Corporation 1020® imaging apparatus test fixture and there resulted, subsequent to formation of a latent electrostatic image and development, copies of excellent density and superior resolution with no dark bands, and with low background levels.

EXAMPLE II

Spherical magnetic carrier particles extracted from utility fly ash, as described herein, reference Example I, with an average particle diameter of 83 microns, a magnetic moment of 61.5 emu/gram, and an apparent density of 2.5 grams/cm$^3$ were coated with 0.8 percent by weight of a terpolymer of styrene, methacrylate, and vinyl triethoxysilane.

Subsequently, 14.5 pounds of the above prepared carrier particles were blended with 45. 2 grams of a toner composition containing 90 percent by weight of a styrene n-butylmethacrylate copolymer (58/42), and 10 percent by weight of carbon black particles. The mixture was then roll-milled in a jar for 30 minutes.

Thereafter, the developer composition prepared was placed in a Xerox Corporation 9500® copying apparatus.

Visual observation of each of the resulting 150,000 copies indicated low background and excellent resolution, and no bead carryout was evident on the resulting copies.

EXAMPLE III

One thousand grams of spherical magnetic carrier particles extracted from utility fly ash, in accordance with the process of Example I, with an average size of 74 microns, a magnetic moment of 63 emu/gram, a density of 2.4 grams/cm$^3$, were blended with 30 grams of a toner composition containing a mixture of styrene n-butylmethacrylate copolymer resin, 67.5 percent by weight, containing 58 percent percent by weight of styrene and 42 percent by weight of n-butylmethacrylate, which resin contains therein 7 percent by weight of polypropylene wax, and a crosslinked styrene, butylacrylate, acrylonitrile terpolymer, 22.5 percent by weight, 10 percent by weight of carbon black, and as additives 0.35 percent by weight zinc stearate and 0.65 percent by weight of collodial silica. After roll milling for 30 minutes, the resulting developer mixture was placed in a Xerox Corporation 1035® test machine, and there was generated for 1,000 imaging cycles copies of excellent resolution with minimum background, and no bead leakage (an absence of white spots).

EXAMPLE IV

There were prepared magnetic particles extracted from utility fly ash by repeating the process steps as recited in Example I of U.S. Pat. No. 3,769,053, the disclosure of which is totally incorporated herein by reference. There resulted particles that had an average size diameter of less than 44 microns, a magnetic moment of 53 emu/gram, and an apparent density of 2.2 grams/$cm^3$.

Subsequently, 1,000 grams of the above-prepared particles were blended with 30 grams of a toner composition comprised of 90 percent by weight of the resin particles of Example I, and 10 percent by weight of carbon black particles. There was further blended into the toner composition as additives 0.7 percent of Aerosil and 0.7 percent of zinc stearate. The resulting mixture was then roll milled for 30 minutes and placed in a Xerox Corporation xerographic apparatus available as the 2830® wherein over 100 copies of images were generated. These images were of unacceptable copy quality in that they contained white spot deletions thereon caused by an excessive amount of bead carryout. Small bead components, that is less than 44 microns in diameter, were also evident on the images obtained; and further were present on the fuser roll of the xerographic imaging apparatus. The high level of undesirable bead carryout was attributed to the amount of low magnetic moment of 50 emu/gram and fine particles, that is those with a diameter of less than 44 microns.

EXAMPLE V

Magnetic particles were prepared by repeating the process steps as recited in Example III of the '053 patent wherein there resulted particles with an average diameter of less than 44 microns, a magnetic moment of 51 emu/gram, and an apparent density of 2.2 grams/$cm^2$.

Subsequently, 1,000 grams of these particles were blended with 30 grams of the toner composition of Example IV, and the resulting mixture was roll milled for 30 minutes. Thereafter, this mixture was placed in a xerographic imaging apparatus available from Xerox Corporation as the 2830® wherein over 100 copies of images were generated. These images were of unacceptable copy quality in that they contained white spot deletions caused by an excessive amount of bead carryout. Further, small beads, less than 44 microns, were present on the images obtained; and these beads were observed on the fuser roll present in the 2830® imaging apparatus. The high level of bead carryout was attributed to the amount of low magnetic moment and the fine particles, less than 44 microns, present in the composition selected.

Other modifications of the present invention may occur to those of ordinary skill in the art subsequent to a review of the information presented herein, and these modifications as well as equivalents thereof are intended to be included within the scope of the present invention.

What is claimed is:

1. Spherical carrier compositions prepared from fly ash and comprised of particles with an average particle diameter of greater than 44 microns, a magnetic moment of from about 60 to about 70 electromagnetic units per gram, and an apparent density of equal to, or greater than about 2.4 grams/$cm^3$.

2. Carrier particles in accordance with claim 1 wherein the apparent density is from 2.4 grams/$cm^3$ to 2.6 grams/$cm^3$.

3. Carrier particles in accordance with claim 1 wherein the magnetic moment is from about 60 to about 65 electromagnetic units per gram.

4. Carrier particles in accordance with claim 1 further including thereover a coating.

5. Carrier particles in accordance with claim 4 wherein the coating is comprised of polymers.

6. Carrier particles in accordance with claim 5 wherein there are selected as coating fluoropolymers.

7. Carrier particles in accordance with claim 5 wherein there are selected as coatings terpolymers of methacrylate, styrene and organosilanes.

8. An improved developer composition comprised of toner resin particles, pigment particles and the carrier particles of claim 1.

9. An improved developer composition in accordance with claim 8 wherein the toner resin particles are comprised of styrene polymers.

10. An improved developer composition in accordance with claim 8 wherein the toner resin particles are comprised of styrene methacrylate or styrene acrylate copolymers.

11. An improved developer composition in accordance with claim 8 wherein the pigment particles are comprised of carbon black.

12. An improved developer composition in accordance with claim 8 wherein the pigment particles are comprised of magnetite.

13. An improved developer composition in accordance with claim 8 wherein the magnetic moment of the carrier particles are from about 60 to about 65 electromagnetic units per gram.

14. An improved developer composition in accordance with claim 8 wherein the resin particles are comprised of a mixture of styrene polymers and a terpolymer.

15. An improved developer composition in accordance with claim 8 further including therein additive particles.

16. An improved developer composition in accordance with claim 15 wherein the additive particles are selected from the group consisting of colloidal silicas, metal salts, and metal salts of a fatty acid.

17. A method for generating images of high quality with no adverse bead carryout and no white spots on the resulting images which comprises generating an electrostatic latent image; subsequently developing the image formed with a developer composition comprised of toner resin particles, pigment particles, and the carrier particles of claim 1; subsequently transferring the resulting image to a suitable substrate; and thereafter permanently affixing the image thereto.

18. A method of imaging in accordance with claim 17 wherein the carrier particles have an apparent density of greater than 2.4 grams/$cm^3$.

19. A method of imaging in accordance with claim 17 wherein the magnetic moment of the spherical carrier particles is from about 60 to about 65 electromagnetic units per gram.

20. A method of imaging in accordance with claim 17 wherein the resin particles are comprised of styrene polymers.

21. A method of imaging in accordance with claim 17 wherein the resin particles are comprised of a mixture of styrene polymers and a terpolymer.

22. A method of imaging in accordance with claim 17 wherein the pigment particles are selected from the group consisting of carbon black and magnetites.

23. Carrier particles in accordance with claim 1 wherein the average diameter of these particles is from greater than 44 microns to about 180 microns.

24. A toner carrier composition comprising a toner carrier core composition, derived from fly ash, which is a mixture of metal oxide particulates wherein iron is the principal metal element and the other metal elements include one or more of silicon, aluminum, calcium, sodium, potassium and magnesium, wherein the particle size of the particulates is from about about 44 to 120 microns, and the composition has a saturation magnetization of 60 to 70 emu/g, an apparent density of 2.4 g/cm$^3$, or greater, and 0.8% by weight of an electrostatic carrier particle coating material.

25. A toner carrier composition comprising a toner carrier core composition, derived from fly ash, which is a mixture of metal oxide particulates wherein iron is the principal metal element and the other metal elements include one or more of silicon, aluminum, calcium, sodium, potassium and magnesium, wherein the particle size of the particulates is from about 44 to 120 microns, and the composition has a saturation magnetization of 60 to 70 emu/g, and an apparent density of 2.4 g/cm$^3$, or greater.

26. Carrier particles in accordance with claim 25 wherein the magnetic moment is from about 60 to about 70 electromagnetic units per gram, and the apparent density is equal to or greater than about 2.4 grams/cm$^3$.

27. Carrier particles in accordance with claim 25 wherein the magnetic moment is about 70 electromagnetic units per gram.

28. Carrier particles in accordance with claim 25 wherein the apparent density is about 2.4 grams/cm$^3$.

29. Carrier particles in accordance with claim 25 with a diameter of from about 44 microns to about 180 microns.

30. Carrier particles in accordance with claim 25 with a diameter of greater than about 44 microns and less than about 125 microns.

31. Carrier compositions obtained from fly ash and comprised of particles with an average particle diameter of greater than about 44 microns, a magnetic moment of from about 50 to about 70 electromagnetic units per gram, and an apparent density of at least 2.2 grams/cm$^3$, which particles contain thereof a coating.

32. Carrier particles in accordance with claim 31 wherein the coating is comprised of polymers.

33. Carrier particles in accordance with claim 31 wherein the coatings are comprised of fluoropolymers or terpolymers of methacrylate, styrene, and organosilanes.

34. Carrier compositions in accordance with claim 31 with a diameter of from about 44 microns to about 180 microns.

35. A toner carrier composition comprising toner carrier core particulates derived from fly ash, which core comprises a mixture of metal compounds wherein iron is the principle metal element, and the other metal elements include one or more of monovalent atoms from Group IA of the Periodic Table, divalent atoms from Group IIA of the Periodic Table, and atoms from Group IVB, Group IVA or Group IIIA of the Periodic Table; wherein the particle size of the particulates is from about 44 to about 180 microns, and the composition has a saturation magnetization of from about 50 to about 70 electromagnetic units per gram, and an apparent density of at least 2.2 grams/cm$^3$.

36. A toner carrier composition in accordance with claim 35 wherein the other metal elements include one or more of silicon, aluminum, calcium, sodium, potassium, and magnesium.

37. A toner carrier composition in accordance with claim 35 wherein the particulates are of an average diameter of from about 44 to about 180 microns.

38. A toner carrier composition in accordance with claim 35 wherein the saturation magnetization is from about 60 to about 70 electromagnetic units per gram.

39. A toner carrier composition in accordance with claim 35 wherein the apparent density is equal to or greater than 2.4 grams per cm$^3$.

40. A toner carrier composition in accordance with claim 35 wherein the saturation magnetization is 70 electromagnetic units per gram.

41. A toner carrier composition in accordance with claim 35 wherein the apparent density is from about 2.4 grams/cm$^3$ to about 2.6 grams/cm$^3$.

42. A toner carrier composition in accordance with claim 35 which carrier contains a polymeric coating thereover.

43. A developer composition comprised of the toner carrier core composition of claim 35 or claim 42, and a toner composition.

44. A developer composition in accordance with claim 43 wherein the toner composition is comprised of resin particles and pigment particles.

45. A developer composition in accordance with claim 44 wherein the resin particles are comprised of styrene polymers.

46. A developer composition in accordance with claim 45 wherein the polymers are styrene acrylates, styrene methacrylates, or mixtures thereof.

47. A developer composition in accordance with claim 44 wherein the pigments are carbon black, magnetite, or mixtures thereof.

48. A carrier composition in accordance with claims 26, 27, 28, 35, 36, 39, or 40 wherein said carrier particles are spherical.

49. A method for generating images of high quality with no adverse bead carryout and no white spots on the resulting images, which comprises generating an electrostatic latent image; subsequently developing the image formed with a developer composition comprised of toner resin particles, pigment particles, and the carrier particles of claims 25, 31, 32, 33, 34, 35, 38, 41 or 48; subsequently transferring the resulting image to a suitable substrate; and thereafter permanently affixing the image thereto.

50. Carrier particles in accordance with claims 25 or 31 wherein the apparent density is from about 2.4 to about 2.6 grams/cm$^3$.

51. A developer composition comprised of a toner composition, and the carrier particles of claim 25, claim 28, claim 29, claim 31, claim 33, or claim 50.

52. A developer composition in accordance with claim 51 wherein the toner composition is comprised of resin particles and pigment particles.

53. A developer composition in accordance with claim 51 wherein the resin particles are comprised of styrene polymers.

54. A developer composition in accordance with claim 51 wherein the resin particles are comprised of styrene methacrylates, styrene acrylates, or mixtures thereof.

55. A developer composition in accordance with claim 51 wherein the pigment particles are comprised of carbon black, magnetite, or mixtures thereof.

56. A developer composition in accordance with claim 51 containing additive particles.

57. Carrier particles in accordance with claim 56 wherein the additives are present in an amount of from about 0.1 to about 1 percent by weight.

58. Carrier particles in accordance with claim 57 wherein the additives are selected from the group consisting of metal salts of fatty acids, metal salts, and colloidal silicas.

59. Carrier particles in accordance with claim 58 wherein the additives are selected from zinc stearate, Aerosil, or mixtures thereof.

60. A developer composition in accordance with claim 56 wherein the additive particles are selected from the group consisting of colloidal silicas, metal salts, metal salts of a fatty acid, and waxy components.

61. Carrier particles in accordance with claim 60 wherein the the waxy component possesses a molecular weight of from about 1,000 to about 20,000.

62. Carrier particles in accordance with claim 61 wherein the waxy component is selected from the group consisting of polyethylenes and polypropylenes.

63. Carrier particles in accordance with claim 31 wherein the apparent density is equal to or greater than 2.4 grams/cm$^3$.

64. A developer composition in accordance with claim 51 wherein the carrier particles are spherical.

65. Carrier particles in accordance with claim 50 wherein said particulates are spherical.

66. A toner carrier core in accordance with claim 35 comprised of a mixture of iron oxides and said other metal elements.

67. Carrier particles in accordance with claim 25, claim 31, or claim 35 comprised of magnetic particles.

68. Carrier particles in accordance with claim 67 wherein the magnetic particles are comprised of a major amount of iron oxides.

69. Carrier particles in accordance with claim 67 wherein the magnetic particles are comprised of a mixture of iron oxides and one or more of monovalent atoms from Group IA of the Periodic Table, divalent atoms from Group IIA of the Periodic Table, and atoms from Group IVB, Group IVA, or Group IIIA of the Periodic Table.

70. A carrier composition in accordance with claims 31, 32, 33, or 42 wherein the coating is present in an amount of 0.8 weight percent.

71. A carrier composition in accordance with claim 48 wherein the coating is present in an amount of 0.8 weight percent.

* * * * *